(12) United States Patent
Yang

(10) Patent No.: US 9,018,843 B2
(45) Date of Patent: *Apr. 28, 2015

(54) LED DEVICE WITH VOLTAGE-LIMITING UNIT AND VOLTAGE-EQUALIZING AND CURRENT LIMITING RESISTANCES

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,005

(22) Filed: Apr. 28, 2014

(65) Prior Publication Data

US 2014/0232296 A1 Aug. 21, 2014

Related U.S. Application Data

(62) Division of application No. 13/025,331, filed on Feb. 11, 2011, now Pat. No. 8,749,169.

(51) Int. Cl.
*H05B 37/00* (2006.01)
*H05B 33/08* (2006.01)

(52) U.S. Cl.
CPC .......... *H05B 33/0806* (2013.01); *H05B 33/083* (2013.01); *H05B 33/089* (2013.01)

(58) Field of Classification Search
USPC .............. 315/185 R, 291, 299, 300, 306, 310
See application file for complete search history.

(56) References Cited

U.S. PATENT DOCUMENTS

| | | | | |
|---|---|---|---|---|
| 3,967,257 A * | 6/1976 | Hager | ........................... | 340/664 |
| 7,157,859 B2 * | 1/2007 | Inoue | ........................ | 315/185 R |
| 7,671,541 B2 * | 3/2010 | Hickey | ........................ | 315/307 |

* cited by examiner

*Primary Examiner* — Thuy Vinh Tran
(74) *Attorney, Agent, or Firm* — Bacon & Thomas, PLLC

(57) ABSTRACT

The present invention provides a LED device with voltage-limiting unit and voltage-equalizing and current-limiting resistances, in which a LED is connected in parallel with a voltage-limiting unit, and a current-limiting resistance is connected in series between the LED and the voltage-limiting unit, and two ends of each LED are connected in parallel with an voltage-equalizing resistance for forming a light-emitting unit, so that a light-emitting unit set can be structured through connecting two or more than two of the mentioned light-emitting units in series or in series-parallel in the same polarity; with the two ends of each LED being connected in parallel with the voltage-equalizing resistance, the end voltage of each light-emitting unit can be evenly stabilized; and the current-limiting resistance is connected in series between the connection joints of the LED and the voltage-limiting unit for limiting the shunt current passing through the voltage-limiting unit.

6 Claims, 2 Drawing Sheets

LED DEVICE WITH VOLTAGE-LIMITING UNIT AND VOLTAGE-EQUALIZING AND CURRENT LIMITING RESISTANCES

This application is a divisional of U.S. patent application Ser. No. 13/025,331, filed Feb. 11, 2011, and now allowed.

BACKGROUND OF THE INVENTION (a) Field of the Invention

According to the present invention, hereinafter the term "LED" is the abbreviation of the light-emitting diode;

The present invention relates to a LED device with voltage-limiting unit and voltage-equalizing and current-limiting resistances, in which a LED is connected in parallel with a voltage-limiting unit, and a current-limiting resistance is connected in series between the connection joints of the LED and the voltage-limiting unit for limiting the shunt current passing through the voltage-limiting unit, and two ends of each LED are connected in parallel with an voltage-equalizing resistance, so when plural light-emitting units are connected in series (or series-parallel) for forming a light-emitting unit set, the end voltage of each LED can be stabilized.

(b) Description of the Prior Art

Conventional LEDs usually parallel connect with the voltage-limiting units in the same polarity at two ends of each LED, such as the zener diode, to constitute the light-emitting unit, thereby when the end voltage of LED is abnormally increased, the abnormal voltage is absorbed by the zener diode; however, when the light-emitting units being parallel connected by the above mentioned LED and the zener diode are series connected (including series-parallel connected) in plural sets to constitute the light-emitting unit, the voltage is not able to be evenly distributed due to the different properties of the LED and the zener diode, so that when subject to abnormal high voltage, the LED loaded with higher end voltage is passed by the higher current therefore the LED is often damaged.

SUMMARY OF THE INVENTION

The present invention provides a LED device with voltage-limiting unit and voltage-equalizing and current-limiting resistances, in which a LED is connected in parallel with a voltage-limiting unit, and a current-limiting resistance is connected in series between the LED and the voltage-limiting unit, and two ends of each LED are connected in parallel with an voltage-equalizing resistance for forming a light-emitting unit, so that a light-emitting unit set can be structured through connecting two or more than two of the mentioned light-emitting units in series or in series-parallel in the same polarity; with the two ends of each LED being connected in parallel with the voltage-equalizing resistance, the end voltage of each light-emitting unit can be evenly stabilized; and the current-limiting resistance is connected in series between the connection joints of the LED and the voltage-limiting unit for limiting the shunt current passing through the voltage-limiting unit.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF MAIN COMPONENT SYMBOLS

101: LED Light-emitting diode
105: Voltage-limiting unit
106: Diode
107: Voltage-equalizing resistance
111: Current-limiting resistance

DETAILED DESCRIPTION OF THE PREFERRED EMBODIMENT

Conventional LEDs usually parallel connect with the voltage-limiting units in the same polarity at two ends of each LED, such as the zener diode, to constitute the light-emitting unit, thereby when the end voltage of LED is abnormally increased, the abnormal voltage is absorbed by the zener diode; however, when the light-emitting units being parallel connected by the above mentioned LED and the zener diode are series connected (including series-parallel connected) in plural sets to constitute the light-emitting unit, the voltage is not able to be evenly distributed due to the different properties of the LED and the zener diode, so that when subject to abnormal high voltage, the LED loaded with higher end voltage is passed by the higher current therefore the LED is often damaged.

The present invention relates to a LED device with voltage-limiting unit and voltage-equalizing and current-limiting resistances, in which a LED is connected in parallel with a voltage-limiting unit, and a current-limiting resistance is connected in series between the connection joints of the LED and the voltage-limiting unit for limiting the shunt current passing through the voltage-limiting unit, and two ends of each LED are connected in parallel with an voltage-equalizing resistance, so when plural light-emitting units are connected in series (or series-parallel) for forming a light-emitting unit set, the end voltage of each LED can be stabilized.

Figure 1:
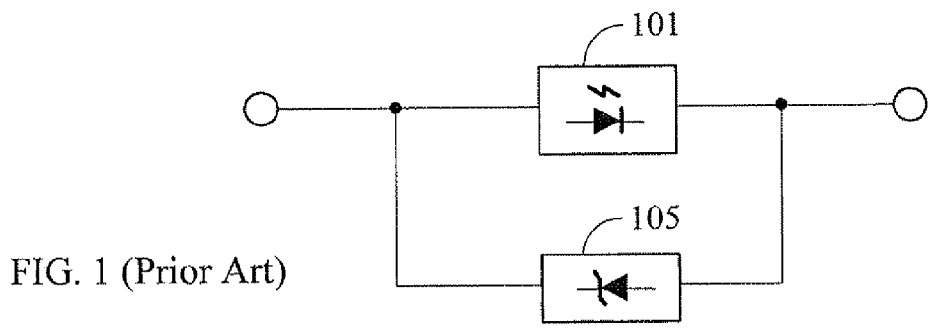
FIG. 1 is a circuit schematic diagram showing that a conventional light-emitting unit is constituted by a single LED being connected in parallel with a single voltage-limiting protective unit.

Referring to FIG. 1, which is a circuit schematic diagram showing that a conventional light-emitting unit is constituted by a single LED being connected in parallel with a single voltage-limiting protective unit.

As shown in FIG. 1, a light-emitting unit is structured through connecting a LED in parallel in the same polarity with a zener diode.

Figure 2:
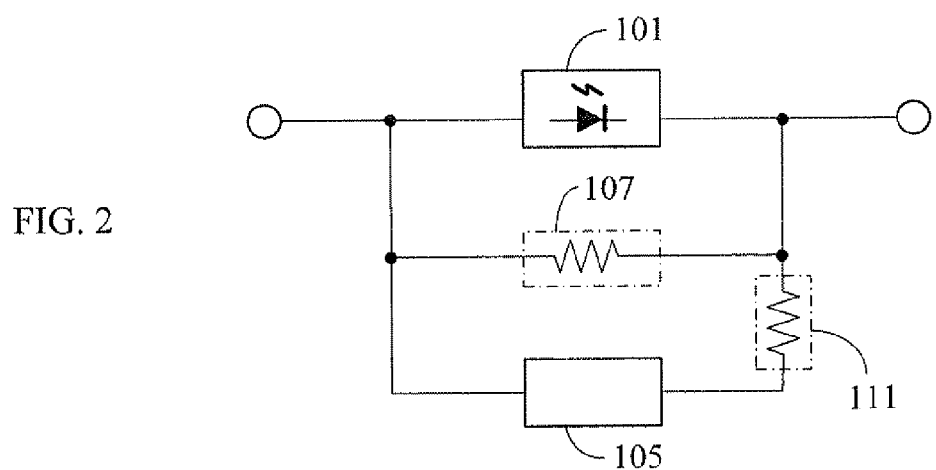
FIG. 2 is a circuit schematic diagram showing that a LED is connected in parallel with a voltage-equalizing resistance, and a voltage-limiting unit is connected in series with a current-limiting resistance then connected in parallel with the LED to constitute the light-emitting unit.

Referring to FIG. 2, which is a circuit schematic diagram showing that a LED is connected in parallel with a voltage-equalizing resistance, and a voltage-limiting unit is connected in series with a current-limiting resistance then connected in parallel with the LED to constitute the light-emitting unit, according to the present invention.

As shown in FIG. 2, it mainly consists of:
LED (101): constituted by the light emitting diode;
Voltage-limiting unit (105): constituted by a semiconductor unit, e.g. a zener diode or a varistor, with a property of the resistance thereof being rapidly dropped when subject to overvoltage;
Voltage-equalizing resistance (107): constituted by the resistive unit and served to be parallel connected at two ends of each LED;
Current-limiting resistance (111): constituted by the resistive unit and served to be installed between the LED (101) and the voltage-limiting unit (105);
Wherein a light-emitting unit is structure through parallel-connecting the LED (101) with the voltage-equalizing resistance (107), and series-connecting the voltage-limiting unit (105) with the current-limiting resistance (111) then parallel-connecting with the LED (101).

Figure 3:
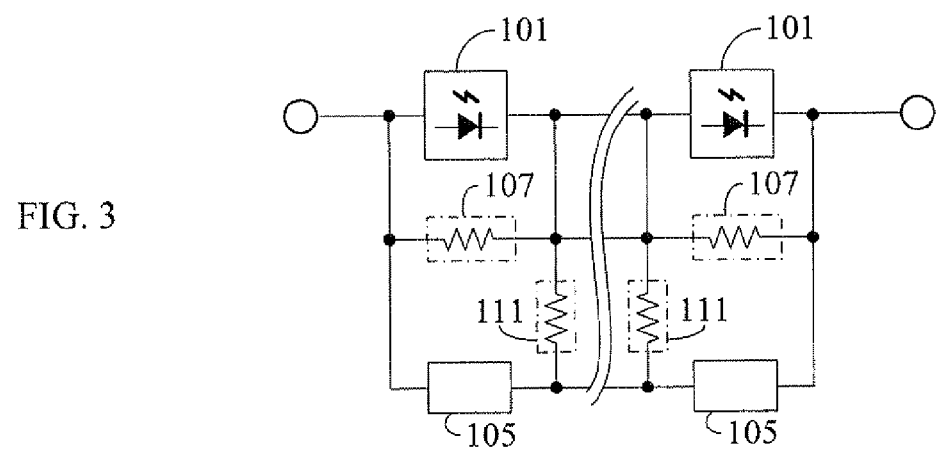
FIG. 3 is a circuit schematic diagram showing that plural sets of the light-emitting units as shown in FIG. 2 are connected in series or in series-parallel in the same polarity to constitute the light-emitting unit set.

Referring to FIG. 3, which is a circuit schematic diagram showing that plural sets of the light-emitting units as shown in FIG. 2 are connected in series or in series-parallel in the same polarity to constitute the light-emitting unit set.

As shown in FIG. 3, it mainly consists of:
LED (101): constituted by the light emitting diode;
Voltage-limiting unit (105): constituted by a semiconductor unit, e.g. a zener diode or a varistor, with a property of the resistance thereof being rapidly dropped when subject to overvoltage;
Voltage-equalizing resistance (107): constituted by the resistive unit and served to be parallel connected at two ends of each LED;
Current-limiting resistance (111): constituted by the resistive unit and served to be installed between the LED (101) and the voltage-limiting unit (105);
wherein a light-emitting unit is structure through parallel-connecting the LED (101) with the voltage-equalizing resistance (107), and series-connecting the voltage-limiting unit (105) with the current-limiting resistance (111) then parallel-connecting with the LED (101);
A light-emitting unit set is structured through series-connecting or series-parallel connecting two or more than two of the mentioned light-emitting units in the same polarity.

Figure 4:
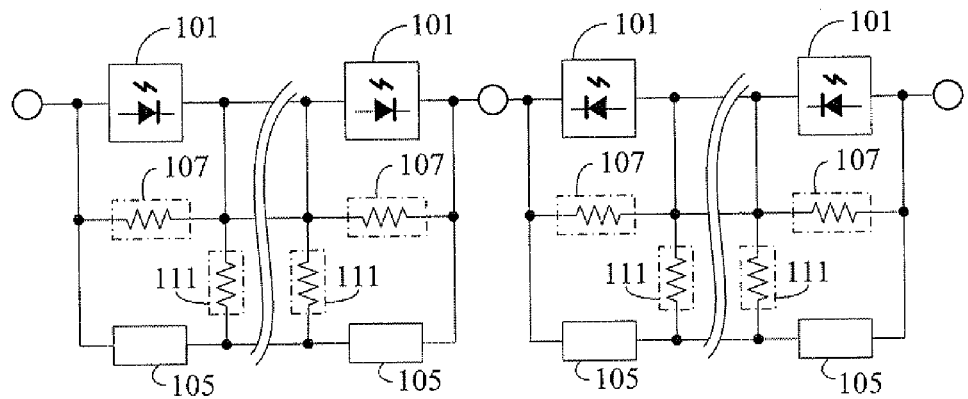
FIG. 4 is an applied circuit schematic diagram showing that two of the light-emitting unit sets as shown in FIG. 3 are in reverse-polarity series connection.

Referring to FIG. 4, which is an applied circuit schematic diagram showing that two of the light-emitting unit sets as shown in FIG. 3 are in reverse-polarity series connection.

As shown in FIG. 4, it mainly consists of:
LED (101): constituted by the light emitting diode;
Voltage-limiting unit (105): constituted by a semiconductor unit, e.g. a zener diode or a varistor, with a property of the resistance thereof being rapidly dropped when subject to overvoltage;
Voltage-equalizing resistance (107): constituted by the resistive unit and served to be parallel connected at two ends of each LED;
Current-limiting resistance (111): constituted by the resistive unit and served to be installed between the LED (101) and the voltage-limiting unit (105);
wherein a light-emitting unit is structure through parallel-connecting the LED (101) with the voltage-equalizing resistance (107), and series-connecting the voltage-limiting unit (105) with the current-limiting resistance (111) then parallel-connecting with the LED (101);
A light-emitting unit set is structured through series-connecting or series-parallel connecting two or more than two of the mentioned light-emitting units in the same polarity;
Two or more than two of the mentioned light-emitting unit sets are connected in series in the reverse polarity.

Figure 5:
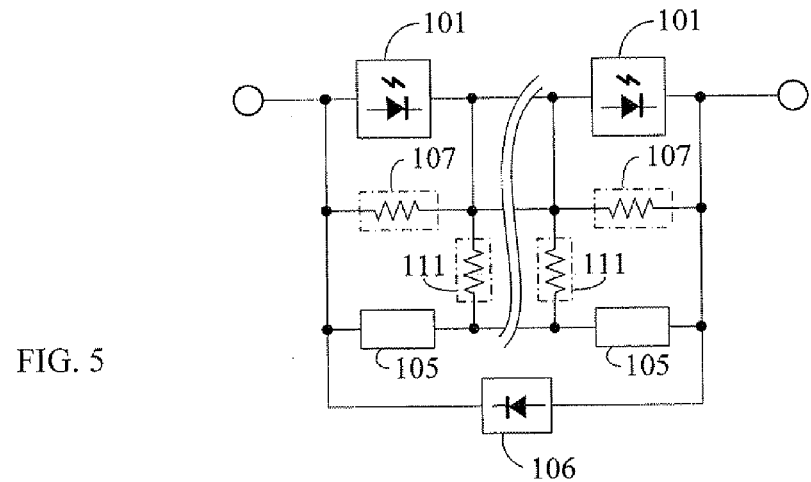
FIG. 5 is an applied circuit schematic diagram showing that two ends of the light-emitting unit set as shown in FIG. 3 are in reverse-polarity parallel connection with a diode.

Referring to FIG. 5, which is an applied circuit schematic diagram showing that two ends of the light-emitting unit set as shown in FIG. 3 are in reverse-polarity parallel connection with a diode.

As shown in FIG. 5, it mainly consists of:
LED (101): constituted by the light emitting diode;
Voltage-limiting unit (105): constituted by a semiconductor unit, e.g. a zener diode or a varistor, with a property of the resistance thereof being rapidly dropped when subject to overvoltage;
Voltage-equalizing resistance (107): constituted by the resistive unit and served to be parallel connected at two ends of each LED;
Current-limiting resistance (111): constituted by the resistive unit and served to be installed between the LED (101) and the voltage-limiting unit (105);
wherein a light-emitting unit is structure through parallel-connecting the LED (101) with the voltage-equalizing resistance (107), and series-connecting the voltage-limiting unit (105) with the current-limiting resistance (111) then parallel-connecting with the LED (101);
A light-emitting unit set is structured through series-connecting or series-parallel connecting two or more than two of the mentioned light-emitting units in the same polarity;
Two ends of the mentioned series-connected light-emitting unit set in the same polarity are connected in parallel in the reverse polarity with a diode (106).

Figure 6:
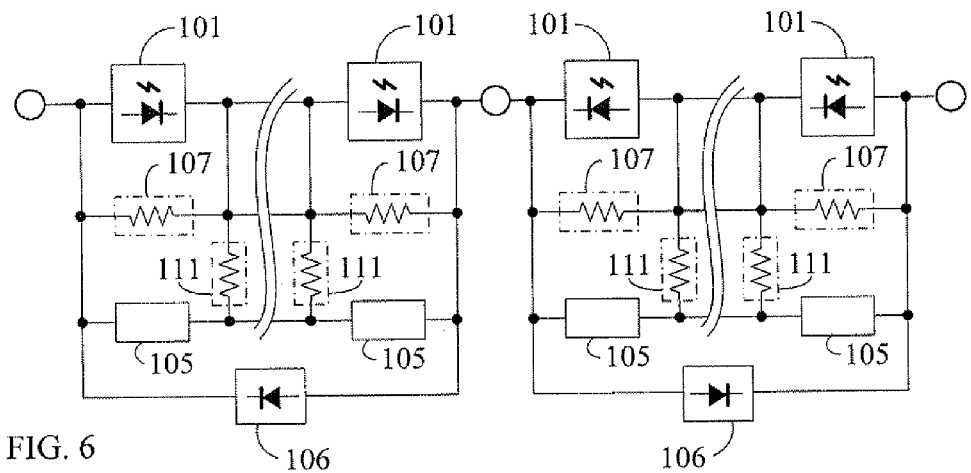
FIG. 6 is an applied circuit schematic diagram showing that two or more than two of the light-emitting unit sets as shown in FIG. 4, which are connected in series in the reverse polarity, and among the plural reverse-polarity series light-emitting unit sets, two ends of the plural light-emitting unit sets which are in same-polarity series or series-parallel connection are respectively connected in parallel in the reverse polarity with a diode.

Referring to FIG. 6, which is an applied circuit schematic diagram showing that two or more than two of the light-emitting unit sets as shown in FIG. 4, which is connected in series in the reverse polarity, and among the plural reverse-polarity series light-emitting unit sets, two ends of the plural light-emitting unit sets which are in same-polarity series or series-parallel connection are respectively connected in parallel in the reverse polarity with a diode.

As shown in FIG. 6, it mainly consists of:
LED (101): constituted by the light emitting diode;
Voltage-limiting unit (105): constituted by a semiconductor unit, e.g. a zener diode or a varistor, with a property of the resistance thereof being rapidly dropped when subject to overvoltage;
Voltage-equalizing resistance (107): constituted by the resistive unit and served to be parallel connected at two ends of each LED;
Current-limiting resistance (111): constituted by the resistive unit and served to be installed between the LED (101) and the voltage-limiting unit (105);
Wherein a light-emitting unit is structure through parallel-connecting the LED (101) with the voltage-equalizing resistance (107), and series-connecting the voltage-limiting unit (105) with the current-limiting resistance (111) then parallel-connecting with the LED (101);
A light-emitting unit set is structured through series-connecting or series-parallel connecting two or more than two of the mentioned light emitting units in the same polarity;
Two or more than two of the mentioned light-emitting unit sets are connected in series in the reverse polarity;

In the light-emitting unit sets of different polarity sides, which are connected in series in the reverse polarity, two ends of the plural light-emitting unit sets in normal-polarity series connection or series-parallel connection are respectively connected in parallel in the reverse polarity with a diode (106).

According to the LED device with voltage-limiting unit and voltage-equalizing and current-limiting resistances of the present invention, the mentioned LED (101) can not only be structured with a single LED (101), but two or more than two LEDs (101) can be provided for structuring a LED unit through connecting the LEDs in series, in parallel or in series and parallel to replace the single LED (101).

According to the LED device with voltage-limiting unit and voltage-equalizing and current-limiting resistances of the present invention, the voltage-limiting protective unit consists one or morn than more of the following units, wherein one or more than one units being in same-polarity series, parallel or series and parallel connection, which include:
zener diode;
varistor;
diode with property of forward voltage drop;
zener diode with property of reverse-polarity forward voltage drop According to the present invention, the power source for the provided LED device can be a constant-current power source or constant-voltage power source, or a current-limiting power source or voltage-limiting power source, or a power source wherein voltage and current not being particularly controlled; for cooperating the operation of the voltage-limiting unit of the present invention, an internal impedance at an output end of the power source or an impedance unit between the output end of the power source and the loading can be further provided, so when the voltage of the power source is altered, the current passing through the voltage-limiting unit generates a voltage drop at the two ends of the impedance unit, and a voltage regulation effect is provided to the voltage at the two ends of the LED device of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The invention claimed is:

1. An LED device including at least one light emitting unit, said at least one light emitting unit comprising:
   at least one light emitting diode (101);
   a voltage-limiting unit (105) including a semiconductor unit having a resistance that rapidly drops when subject to overvoltage;
   a voltage-equalizing resistance (107) including a first resistive unit parallel connected at two ends of said at least one light emitting diode (101);
   a current-limiting resistance (111) including a second resistive unit and installed between the light emitting diode (101) and the voltage-limiting unit (105);
   wherein the voltage-limiting unit (105) is series connected with the current-limiting resistance (111) and parallel-connected with both the voltage-equalizing resistance and the light emitting diode (101) to form the at least light emitting unit.

2. The LED device as claimed in claim 1, further comprising at least one second light-emitting unit connected with said at least one light-emitting unit, wherein said light emitting diode (101) in said at least one light-emitting unit is connected in series with and has a same polarity as a second light emitting diode (101) in the at least one second light-emitting unit to form a same-polarity light-emitting unit set.

3. The LED device as claimed in claim 2, wherein said same-polarity light-emitting unit set is connected in series with at least one second same-polarity light-emitting unit set, the second same-polarity light-emitting unit set having third and fourth light-emitting units connected to each other, the third and fourth said light-emitting units respective including a third light emitting diode (101) and a fourth light emitting diode (101), the third and fourth light emitting diodes being connected to each other in series and each having a polarity that is opposite a polarity of said at least one light emitting diode and second light emitting diode (101).

4. The LED device as claimed in claim 2, wherein said voltage-equalizing resistance (107) in said at least one light-emitting unit is further connected to a second voltage-equalizing resistance in the at least one second light-emitting unit, and a first voltage-limiting unit (105) in at least one said light-emitting unit is further connected to a second voltage-limiting unit (105) in the at least one second light-emitting unit.

5. The LED device as claimed in claim 1, wherein said at least one light emitting-unit includes more than one light emitting diode (101) connected to each other in series, in parallel, or in series and parallel.

6. The LED device as claimed in claim 1, wherein the semiconductor unit of the voltage-limiting unit (105) consists of one or more of the following semiconductor devices-in series, parallel or series and parallel connection:
   a zener diode;
   a varistor;
   a diode with a property of forward voltage drop; and
   a zener diode with a property of reverse-polarity forward voltage drop.

* * * * *